United States Patent Office 2,939,782
Patented June 7, 1960

2,939,782

METALLURGICAL REFINING PROCESS

Julius D. Madaras, Box 2309, Longview, Tex.

No Drawing. Filed Sept. 26, 1957, Ser. No. 686,293

4 Claims. (Cl. 75—43)

My invention relates to a metallurgical refining process. More particularly, it is applicable to the refining of sponge iron whereby the iron of the sponge iron is separated from its accompanying gangue elements. One method for accomplishing this is by bringing about fusion and conglomoration of the iron and slagging the gangue with a suitable fluxing agent. Typical operations will be described here as carried out in a rotary kiln similar to the type used in cement making.

Example 1.—Sponge iron is preferably made by my process described in my U.S. Patent 2,243,110. Before charging the lumpy iron ore or iron oxide pellets into the reducing chamber of the reducing retort, the ore is mixed with a predetermined amount of limestone. The limestone becomes calcined while the ore is heated and reduced. If the charge in the retort is pelletized ore, fine limestone or other fluxing agents are preferably mixed into the lime ore before forming the pellets. However, if the pellets do not include the limestone, then lime is mixed into the sponge iron at the charging end of the rotary kiln at the start of my refining process.

According to my present invention, the sponge iron obtained by reducing the ore, preferably hot, is fed into the charging end of the rotary kiln which is placed at a predetermined angle and rotated. At the opposite discharge end of the rotary kiln, gas or oil or powdered coal is fired with highly preheated air. The fuel and hot air mixtures are in such proportion that the fuel is only partially combusted so as to form neutral or slightly reducing atmosphere at high temperature so that the flame will not reoxidize the sponge iron. When natural gas is used an air to gas ratio of approximately 8:1 will accomplish the purpose and when powdered coal is used, from 80 to 95 cubic feet air per pound of fuel gives nonoxidizing gas.

The furnace temperature, the rate of feeding of sponge iron into the kiln, and the time of travel of the sponge in the kiln are so regulated that the iron either melts or agglomerates into nuggets of various sizes and the gangue originally in the sponge forms slag and separates from the iron. The slag and the iron are discharged in liquid or pasty form. In the liquid form, the iron easily separates from the slag. When in pasty form, the slag contains the iron nuggets. After the discharge, the slag and iron are cooled by water spray or any other suitable means, the slag is crushed and the iron nuggets are separated by gravity or magnetically or both.

In reducing the sponge iron, it is preferable to leave the iron carburized as much as practical, and to deposit substantial amounts of carbon black in the sponge so that the carbon will not only prevent any incidental oxidation of the sponge but it will substantially lower the fusion point of the iron. This fusion point may be lowered below the temperature of slag formation. For instance, in my operations of making sponge iron, I have regularly succeeded in depositing 4% to 6% carbon. In such a case, the iron forms nuggets below 2400° F. Also, if some iron oxide has not been completely reduced or some iron was reoxidized, the carbon finishes the reduction.

The temperature of slag formation and fluidity is regulated also by the ratio of acid to bases, depending upon the desired end product.

Example 2.—Lumpy or pelletized or roll briquetted sponge iron or their mixture in any proportion are charged into the kiln, preferably in carburized state as previously described. As the kiln rotates and the sponge progresses into the hot zone toward the discharge end, the sponge lumps become heated to a temperature where the iron particles become further carburized and go through incipient fusion, and if desired will go to more complete fusion, while the transformation of gangue into slag is still prevented. When such treated sponge iron is exposed to oxidizing atmosphere, the reduced iron does not reoxidize.

When the sponge iron is charged hot from the reducing retorts, for instance at 1500° to 1700° F. it takes a comparatively small amount of heat in the rotary kiln to heat the sponge to the temperature of incipient fusion of the carburized iron.

The hot sponge iron is then charged directly into a melting furnace, or it is cooled after discharge or dropped through a roll briquetter where it is compacted into very dense forms. When the gangue content of the sponge iron is so high that it is desirable to separate the iron from the gangue, the sponge iron, after discharge from the kiln is cooled, preferably by water spray, or dropped into water, then crushed to a desirable fineness and the iron separated magnetically or by gravity flotation or both.

Example 3.—When lumpy sponge iron and pellets are charged into the rotary kiln, a desired amount of lime or other bases is mixed with it. In course of heating of the mixture in the kiln, the lime forms a glazy slag on the surface of the lumps or pellets closing up the pores and protecting it from oxidization and from surface powdering. The lime also mixes with the powdered form, originally in the sponge or formed by erosion in the kiln and forms slag or incipiently fused slag material and the iron particles then go through a state of fusion and are highly resistant to reoxidation.

What I claim as my invention is:

1. Process which comprises introducing a sponge iron product into one end of a kiln, said product comprising gangue and carburized iron having a melting point below that of the slag formed from said gangue, exposing said sponge iron product to a hot flame under substantially nonoxidizing conditions at a sufficient temperature to reach incipient fusion of said carburized iron but below the melting point of the slag thereby conditioning the iron in the sponge to prevent subsequent oxidation when exposed to an oxidizing atmosphere.

2. Process which comprises introducing into a kiln a sponge iron product comprising gangue and carburized iron having a melting point below that of the slag formed from said gangue and passing a nonoxidizing gas through the same and maintaining the temperature sufficiently high so that the iron forms nuggets from which the gangue is separated.

3. Process according to claim 2 when the nonoxidizing gas is obtained by firing fuel with air in such proportion as to burn the fuel in the kiln with the formation of products of combustion that are neutral or slightly reducing.

4. Process according to claim 1 in which the sponge iron has lime mixed therein.

References Cited in the file of this patent

UNITED STATES PATENTS

| | | |
|---|---|---|
| 809,291 | Fleischer | Jan. 9, 1906 |
| 891,704 | Jones | June 23, 1908 |
| 1,360,711 | Basset | Nov. 30, 1920 |
| 1,717,160 | Kichline | June 11, 1929 |
| 2,450,343 | Howard et al. | Sept. 28, 1948 |